Sept. 12, 1967     R. L. KRIEGER     3,340,661

ORNAMENTAL GRILL

Filed May 5, 1965     2 Sheets-Sheet 1

INVENTOR.
ROBERT L. KRIEGER
BY Wm. R. Price
ATTORNEY

Sept. 12, 1967   R. L. KRIEGER   3,340,661
ORNAMENTAL GRILL
Filed May 5, 1965   2 Sheets-Sheet 2

INVENTOR.
ROBERT L. KRIEGER
BY Wm R. Price
ATTORNEY

United States Patent Office 3,340,661
Patented Sept. 12, 1967

3,340,661
ORNAMENTAL GRILL
Robert L. Krieger, Louisville, Ky., assignor to Mannsville Plastics, Inc., Louisville, Ky., a corporation of Kentucky
Filed May 5, 1965, Ser. No. 453,265
4 Claims. (Cl. 52—456)

ABSTRACT OF THE DISCLOSURE

Discloses an easily removable ornamental grill for producing the illusion of a multipane structure in a single pane window which is fabricated of hollow extruded plastic rods which can be joined together to make selectively variable patterns and sizes utilizing a pin or rod mounted coaxially in at least one rod to reinforce and stiffen the joints without affecting the lateral flexibility of the grill. Also discloses a novel spring loaded clip for mounting the grill onto the window.

This invention relates to grill members for use in forming ornamental grills and more particularly to grill members which can be interconnected with other members to form grills having selectively variable patterns. More particularly, this invention relates to joint structures which allow elongated rod members to be joined together to form selectively variable patterns.

Ornamental grills such as are used in windows and doors have in the past offered several problems. Conventional grill members are made of wood molding which is measured and mitered to fit a particular window or door opening. In such cases it has been necessary to form interconnecting joints by carefully mitering the wood molding and gluing the pieces together to form a joint. As a consequence, the installation of such grills has been laborious, expensive and time consuming. Furthermore, the joints have been weak and the wooden grills required finishing. Metal grills have been utilized; however, these grills tend to rust if welded together or if joined together by use of bolts and screws. Further, the use of metal grills does not have the same aesthetic appeal as those manufactured of or which simulate wooden molding. As a consequence, some operators have turned to grills manufactured of plastic. However, since window and door sizes vary appreciably it has been necessary to make an injection mold in various sizes and various patterns in order to offer a one-piece construction which cost is prohibitively expensive.

It is an object of this invention, therefore, to provide an ornamental grill member which is capable of being formed into selectively variable patterns of selectively variable sizes.

Another object of this invention is the provision of ornamental grill members which may be inexpensively produced with a minimum expenditure of die costs.

It is a further object of this invention to produce an ornamental grill member which can be fabricated of plastic of good quality to be formed in selectively variable patterns.

It is another object of this invention to provide an intersecting joint construction which is simple, variable and strong.

Still another object of this invention is to provide an angular joint construction conducive to being used with plastic rod members which is durable, simple and strong.

Still another object of this invention is the provision of means to compensate for differences in the coefficient of contraction and expansion between the material of fabrication of the grill member and the material of fabrication of the window sill.

Still another object of this invention is the provision of expansion clip means to be used with the grill members of this invention which will facilitate installation and removal of the grill.

Other objects will appear to those skilled in the art from the detailed description and drawings.

The ornamental grill members of this invention, as well as the joint structures, and expansion clip disclosed herein, offer to contractors the flexibility in pattern design of wood molding with the strength and rigidity of one-piece plastic construction. Additionally, provision is made to automatically compensate for differences in the coefficient of expansion and contraction of the material used in fabrication of the grill as compared to the material used in fabrication of the window sill.

Basically, my invention involves the use of extruded plastic rods of pleasing configuration as the basic component of the grill. The preferred plastic material is polyvinyl chloride; however, other materials may be used, and the invention may be applicable to other materials such as wood, metal, etc. In a preferred embodiment, I utilize a hollow extruded fluted rod of polyvinyl chloride such as those illustrated in the attached drawings having four ridges. The rods, being hollow, decrease the weight, increase their insulating capacity and decrease the material cost. According to my invention, the rods are reinforced at their joints by use of a metal pin. This is accomplished according to the pattern to be produced by drilling a hole through the body of the first rod, cutting the end of two other rods to fit over the ridge of the fluted plastic rod, and aligning said rods with the hole. A plastic tube or grommet is inserted in the hollow portion of the two rods prior to the coping operation so that the grommet provides additional gluing surface. Thereafter the pin is fitted into each of the grommets and through the hole of the first rod. A suitable plastic solvent is mixed with the plastic shavings to form a paste which is applied to all of the pieces so that there is formed a solid metal-reinforced unitary joint structure. For an angular joint two rods are mitered so as to register with each other at the desired angle, the metal pin is bent at the desired angle and each end of the pin is inserted into the hollow aperture coaxially with the rod and the joint is cemented together by use of a suitable plastic solvent paste. Additionally, my invention provides spring loaded clips which are inserted into the hollow aperture of the rod at the point where the rod contacts the supporting interconnected window sash frame elements. Preferably a small metal plate is attached to the interconnected window sash frame elements in a slot which engages with the tongue of the spring loaded expansion clips. In this manner, the entire grill may be easily installed and may be easily removed from the window by merely disengaging the spring loaded clips from the cooperating plate.

Since it has been found that the coefficient of expansion and contraction is different for plastic than it is for the sash frame elements, the spring loaded clips automatically compensate for differences in expansion and contraction of the materials during sharp temperature changes so that the grill does not become loose or become bowed during use.

The invention will be better understood by reference to the following description to the attached drawings in which.

Figure 1:
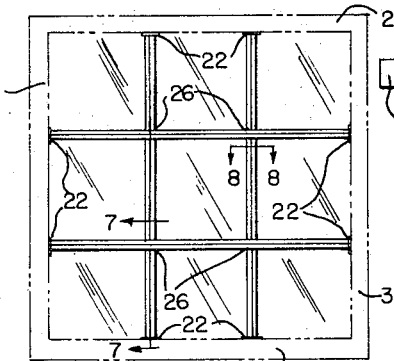
FIG. 1 is an elevational view illustrating a typical rectangular type grill installed in a window.
Figure 2:
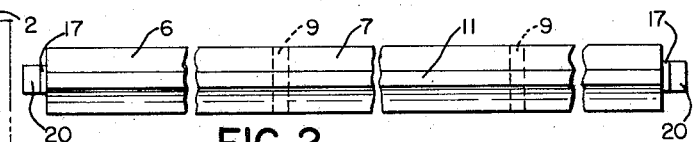
FIG. 2 is an elevational view illustrating an elongated grill member and spring loaded expansion clip.
Figures 3, 4, 5:
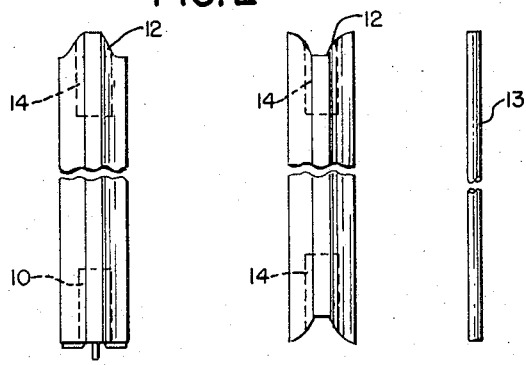
FIG. 3 is an elevational view of a grill member illustrating the relationship of the spring loaded clip thereto and further illustrating the shaped end portion of said member.
FIG. 4 is an elevational view illustrating the shaped end portion of a grill member and the relationship of the grommet thereto.
FIG. 5 is a side elevation of a metal reinforcing pin.
Figure 6:
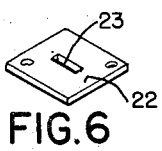
FIG. 6 is a perspective view of the plate member used in conjunction with said spring loaded expansion clip.
Figure 7:
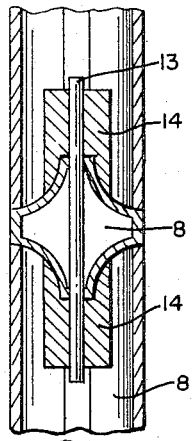
FIG. 7 is a vertical cross-section, taken along lines 7—7 of FIG. 1, illustrating the relationship of the various members to each other.
Figure 8:
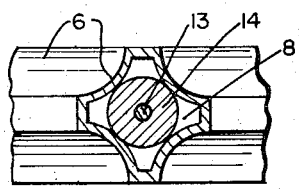
FIG. 8 is a horizontal cross-section, taken along lines 8—8 of FIG. 1, illustrating the relation of the grommet and pin relative to the grill member.
Figure 9:
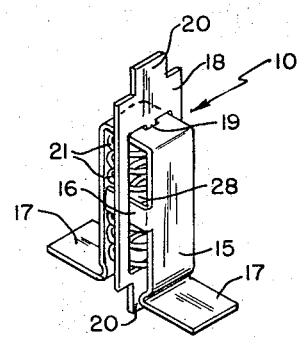
FIG. 9 is a perspective view of the spring loaded clip.

Referring now to the drawings in detail, FIG. 1 illustrates a window assembly consisting of interconnected sash frame elements 1 through 4 which support a pane of glass 5. Mounted in the window assembly is a conventional rectangular patterned grill consisting of grill members 6 joined together through intersecting joints 26 to form the pattern.

The grill member 6, as illustrated, is a hollow extrusion of polyvinyl chloride of fluted configuration so as to have four ridges 11 running longitudinally. The hollow aperture 8 is, in the embodiment shown, of essentially the same shape as the members 6 and runs coaxially with the member 6. The grill member consists of a body portion 7 and an end portion which, when joined together with another grill member to form an intersecting joint 26, is shaped 12 to register with the configuration of the outer surface of the other member. This operation can be performed with a special die which automatically copes the end portion of the rod member 6 and grommet 14 to conform with the outer surface of a similar rod member as indicated by numeral 12. To form an intersecting joint a hole 9 is driven transversely through the body portion of the rod member 6 intermediate its ends. Since, in the embodiment shown, the aperture 8 is of a comparatively large cross-section, I prefer to make use of plastic tubes or grommets 14 which fit into the aperture 8 and have an opening which fits snugly with pin 13. To form an intersecting joint, therefore, the pin 13 after having been coated with a paste consisting of plastic shavings and a suitable solvent such as tetrahydrofurane or methylethylketone acetone etc. is then fitted into hole 9. The grommets 14, having previously been coated with solvent base paste, are placed into aperture 8 of the two members 6, so that pin 13 fits coaxially into the opening of grommet 14 of either side and the shaped end portion 12 is fitted over ridge 11 of the elongated member 6.

The paste formed of plastic shavings and one of the solvents such as above mentioned actually welds the plastic so that the metal pin is then physically embedded in the plastic around the hole 9 and in the plastic of grommet 14. Additionally, the shaped surface 12 of the rod members 6 and grommets 14 are partially dissolved so as to weld with the outer surface of the rod member 6 along the ridge 11. In this manner, there is produced a joint which if properly treated with solvent base paste contains no seams and which is actually physically bonded to the adjacent plastic surfaces. Due to the provision of the metal pin, the joint is extremely strong and will not break under even extreme stress. The pin 13 is preferably fabricated of a non-corrosive metal or coated with zinc, or other comparatively non-corrosive metals, since it has been found that some plastics, and specifically polyvinyl chloride, tend to evolve acidic constituents over a period of time and thus corrode and weaken the pin. Furthermore, coating of the pin with zinc or other metal tends to roughen the surface slightly and provide for a better gluing surface for the solvent base paste.

As shown in the drawings, a spring loaded expansion clip 10 is inserted into the aperture 8 of rod 6 where the rod comes in contact with one of the sash frame elements. The expansion clip 10 consists of a yoke member 15 bent in the form of a U having finger members 16 and ear members 17 at its terminal end bent generally at 90°. Fitted inside of the yoke member is a spring 21. Fitted over the yoke member containing the spring is a tongue plate 18 having an opening 28 wide enough to fit over the yoke member 15. On either end of the opening is a small boss 19 which fits into a slot at the top of the yoke member to help secure said plate in position. At either end of the tongue plate 18 are two tongue members, one of which is designed to fit into slot 23 of plate 22 which is adapted to be fastened to the sash. The tongue member 20 is located at either end since it then makes no difference in assembling the clip 10 as to whether the plate 18 is put on upside down or not.

Figure 13:
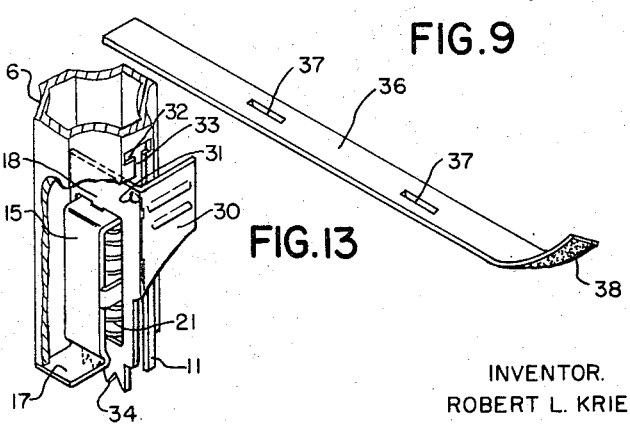
FIG. 13 is a perspective view of a mastic-coated template which may be used instead of a plate for engagement with the tongue of the clip.

In FIG. 13 a modification of a template 36 coated with mastic 38, is used instead of plate 22. The template 36 also contains a slot 37 for engagement with the tongue 20 of clip 10.

Figure 10:
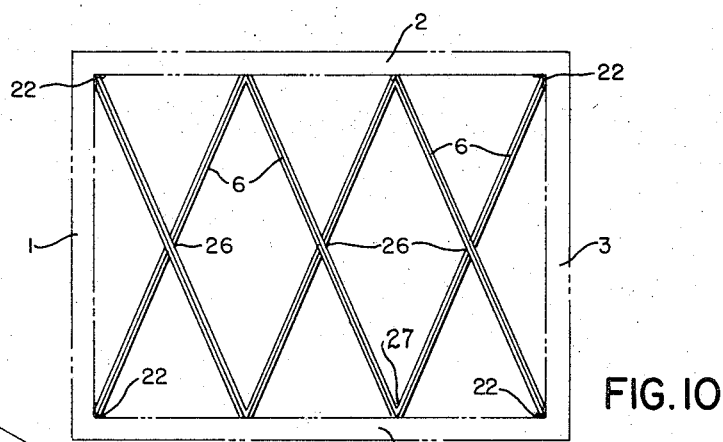
FIG. 10 is an elevational view illustrating a diamond patterned grill.
Figure 11:
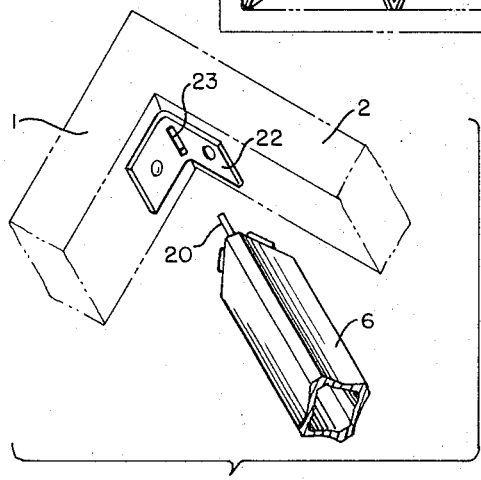
FIG. 11 is a fragmentary perspective view illustrating the manner in which the clip fits into the plate in a corner of the sill.
Figure 12:
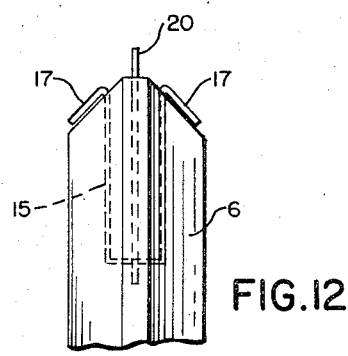
FIG. 12 is a fragmentary view illustrating the shape of the grill member and the angle at which the ears of the clip are bent to accommodate a corner of a sill.
Figure 15:
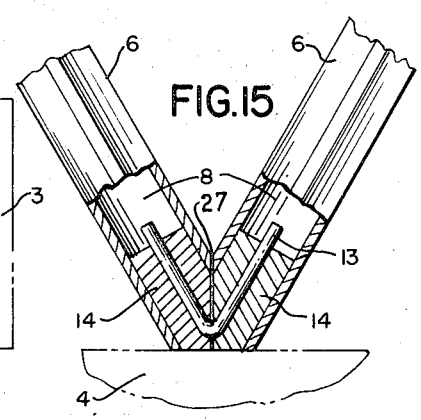
FIG. 15 is an enlarged fragmentary cut away view of an angular joint as depicted in FIG. 10.

As is best illustrated in FIGS. 10 and 15, an angular joint is produced by mitering the ends of two rod members 6, bending the pin member 13 at the desired angle, and inserting each end of the pin into a grommet 14 inserted in each rod member. Again, the joint is coated with solvent base paste to weld the two members together in a firm, unitary angular joint such as is used in producing a diamond-shaped pattern.

Figure 14:
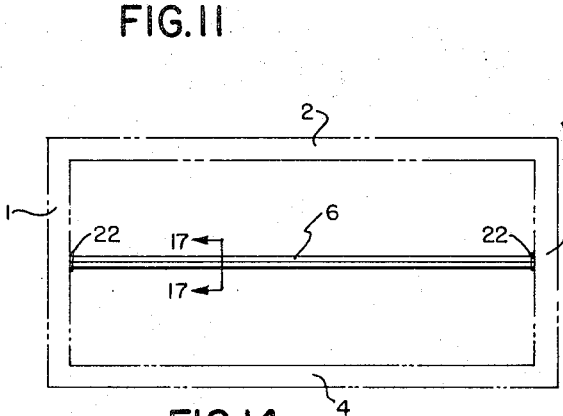
FIG. 14 is a view illustrating a single grill member mounted horizontally in a window.
Figure 17:
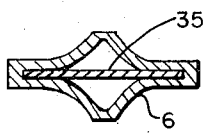
FIG. 17 is a sectional view, taken along lines 17—17 of FIG. 14, illustrating a modified elongated grill member and a reinforcing metal strap which allows flexure in one plane.

One of the features of the grill of this invention is the lateral flexibility of the members. This flexibility, in conjunction with the spring expansion clips of this invention, enables easy installation of the grill into the window opening. By proper choice of materials and by increasing or decreasing the size of the internal aperture 8 of the rod member 6, the flexibility or stiffness of the rod can be varied. In some instances, especially where the rod 6 is of some length, as for example, in a single rod member grill, such as that illustrated in FIG. 14, it is desirable to reinforce the rod to prevent vertical sagging while maintaining a good degree of lateral flexibility. This may be accomplished by inserting a flexible strap of metal 35 into the opening 8 of rod member 6 as is best illustrated in FIG. 17. It will be noted that the design of the rod in FIG. 17 has been modified somewhat so as to accommodate a piece of steel strapping 35, such as is ordinarily used to strap cartons, pallet loads, etc. The resulting metal reinforced rod 6 is rigid across its major axis and flexible across its minor axis due to the flexibility of the steel strapping 35.

Figure 16:
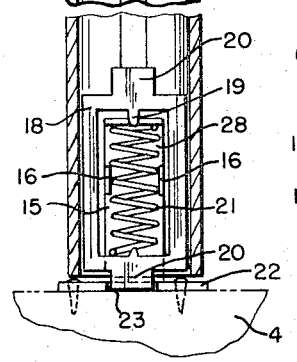
FIG. 16 is a perspective cut away view illustrating a modified form of expansion clip shown in place in a hollow drill member.

Further, in another modification of the spring loaded expansion clip, illustrated in FIG. 16, the tongue 20 has been replaced by saw toothed member 34. This clip is designed for use without a plate 22 or template 36 so that the toothed member 34 will engage with the wood of the sash frame member. Accordingly, an arm member 30, having an engagement boss 31, is formed as an extension of tongue plate 18 which is trained through slot 33 of the rod member 6. At the top of slot 33 there is a transverse slot 32, which engages with engagement boss 31, to hold the toothed portion 34 in a retracted position when the grill is to be removed. In this manner, the plate 18 can be retracted or extended easily for installation or removal of the grill.

It will be obvious to those skilled in the art from the above description that the intersecting joints do not have to be perfectly perpendicular but can be made at somewhat of an angle. Further, it will be appreciated that the angular joints may be made at any desired angle utilizing a pin bent at the desired angle and mitering the ends of the rods in conventional manner. Further, it is within the contemplation of this invention to utilize a coaxial aperture which does not extend throughout the rod and which is of sufficient size to snugly accommodate a pin 13 thus eliminating the plastic grommet 14. Further, it is within the contemplation of this invention to utilize different configurations than the fluted configuration shown herein and to utilize different materials of fabrication other than polyvinyl chloride.

The improvement herein described of producing metal reinforced joint structures of extruded plastic rod members is capable of broad application. Thus, intersecting or angular joints of attractively shaped rods may be utilized in making a variety of articles in a variety of patterns and sizes. Accordingly, the embodiments shown and described herein are intended to be exemplary in nature, and are presented not as limitations as to the scope of the invention, which should be construed broadly so as to be commensurate in scope with the appended claims.

I claim:
1. In combination with a window assembly comprising interconnecting sash frame elements and a pane of glass mounted therein,
   (a) an easily detachable decorative grill comprising a series of interconnected elongated rod members for forming selectively variable patterns and mounted so as to lie in a plane parallel to the plane of said pane of glass and having lateral flexibility in a plane perpendicular to the plane of said pane of glass, the improvement which comprises:
     (1) an intersecting joint structure comprising:
       (a) a first rod member having at least one hole extending transversely through its body intermediate the ends thereof,
       (b) two intersecting rod members each having a shaped end portion which registers with the outer surface of said first rod member and each having a centrally disposed aperture at the end having the shaped end portion,
         (1) said aperture running coaxially with said member,
         (2) said intersecting rod members being mounted on opposite sides of said first rod member in alignment with said hole;
       (c) a short pin mounted internally in said hole and extending coaxially into the apertures in the confronting ends of the two intersecting rod members to reinforce and stiffen the joint without affecting the lateral flexibility of said grill;
       (d) mounting means engageable with the free ends of the rod members contacting the sash frame element.
2. An easily detachable decorative grill, as defined in claim 1, in which:
   (a) the mounting means are resilient members inserted coaxially into the apertures of the free ends of said rod members so as to project therefrom to contact the sash frame element.
3. An easily detachable decorative grill, as defined in claim 1, in which:
   (a) said hole in said first rod member extends transversely and obliquely through its body.
4. An easily detachable decorative grill, as defined in claim 3, the further combination therewith of:
   (a) an angular joint structure, comprising at least two elongated rod members, each having a mitered end and each containing a centrally located aperture in the mitered end which runs coaxially with said rod member,
     (1) said rod members being mounted so that the mitered ends register to form a predetermined angle;
   (b) a pin bent at a predetermined angle and mounted so that each end extends internally into said centrally located apertures of said rod members to form a reinforced angular joint.

References Cited

UNITED STATES PATENTS

| | | | |
|---|---|---|---|
| 1,940,862 | 12/1933 | Henderson | 52—456 X |
| 2,150,651 | 4/1939 | Ewing | 287—54 |
| 3,107,900 | 10/1963 | De Paolo | 256—65 |
| 3,108,336 | 10/1963 | Tate | 52—456 |
| 3,131,440 | 5/1964 | Leeser | 52—456 X |
| 3,254,465 | 5/1966 | Brengman et al. | 52—455 |
| 3,284,113 | 11/1966 | Howell | 287—20.92 |

DAVID J. WILLIAMOWSKY, *Primary Examiner.*

KENNETH DOWNEY, *Examiner.*